(12) United States Patent
Shin et al.

(10) Patent No.: US 11,378,662 B2
(45) Date of Patent: Jul. 5, 2022

(54) OPTICAL INTEGRATED CIRCUIT DEVICE ARRAY HAVING BI-DIRECTIONAL CHARACTERISTICS AND OPTICAL SYSTEM USING THE SAME

(71) Applicant: SAMSUNG ELECTRONICS CO., LTD., Suwon-si (KR)

(72) Inventors: Dong-jae Shin, Seoul (KR); Kyoung-ho Ha, Seoul (KR); Seong-gu Kim, Pyeongtaek-si (KR); Yong-hwack Shin, Hwaseong-si (KR); Chang-gyun Shin, Anyang-si (KR); Dong-sik Shim, Hwaseong-si (KR); Chang-bum Lee, Seoul (KR); Jung-ho Cha, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 904 days.

(21) Appl. No.: 16/150,724

(22) Filed: Oct. 3, 2018

(65) Prior Publication Data

US 2019/0227150 A1 Jul. 25, 2019

(30) Foreign Application Priority Data

Jan. 24, 2018 (KR) .................. 10-2018-0008954

(51) Int. Cl.
*G01S 7/481* (2006.01)
*G01S 7/486* (2020.01)
(Continued)

(52) U.S. Cl.
CPC ............ *G01S 7/4818* (2013.01); *G01S 7/484* (2013.01); *G01S 7/486* (2013.01); *G01S 7/4811* (2013.01); *G01S 17/42* (2013.01); *G01S 17/88* (2013.01)

(58) Field of Classification Search
CPC ...... G01S 7/4818; G01S 7/4811; G01S 7/484; G01S 7/486; G01S 17/42; G01S 17/88
See application file for complete search history.

(56) References Cited

U.S. PATENT DOCUMENTS 6,469,778 B2   10/2002   Asaka et al.
7,221,438 B2   5/2007    Harris
(Continued)

FOREIGN PATENT DOCUMENTS

CN   103384968 A   11/2013
CN   106415309 A   2/2017

OTHER PUBLICATIONS

D. N. Hutchison, et al., "High-resolution aliashing-free optical beam steering", Optical Society of America, Optica, 2016, vol. 3, No. 8, 887-890.
(Continued)

*Primary Examiner* — Yuqing Xiao
*Assistant Examiner* — Sanjida Naser
(74) *Attorney, Agent, or Firm* — Lee IP Law, PC (57) ABSTRACT

The bi-directional optical integrated circuit device array includes a plurality of bi-directional optical integrated circuit unit devices integrated on a substrate and arranged in two-dimensions. Each of the bi-directional optical integrated circuit unit devices includes a single wavelength laser light source integrated on the substrate, a bi-directional optical device integrated on the substrate and optically connected to the laser light source, and an antenna integrated on the substrate and optically connected to the bi-directional optical device.

9 Claims, 8 Drawing Sheets

(51) Int. Cl.
   *G01S 17/42*   (2006.01)
   *G01S 17/88*   (2006.01)
   *G01S 7/484*   (2006.01)

(56) References Cited

U.S. PATENT DOCUMENTS

| | | | |
|---|---|---|---|
| 9,083,144 B2 * | 7/2015 | Busico | G02F 1/0123 |
| 9,476,981 B2 | 10/2016 | Yaacobi et al. | |
| 9,618,530 B2 | 4/2017 | Imaki et al. | |
| 9,753,351 B2 | 9/2017 | Eldada | |
| 2013/0083389 A1 * | 4/2013 | Dakin | G01S 7/484 |
| | | | 359/285 |
| 2015/0378012 A1 * | 12/2015 | Sayyah | G01S 17/34 |
| | | | 356/4.01 |
| 2017/0212218 A1 | 7/2017 | Spuler et al. | |
| 2017/0242100 A1 | 8/2017 | Hinokuma et al. | |
| 2017/0293018 A1 | 10/2017 | Turbiner | |

OTHER PUBLICATIONS

J. C. Hulme, et al., "Fully integrated hybrid silicon two dimensional beam scanner", Optical Society of America, 2015, vol. 23, No. 5.
Chinese Office action dated Mar. 2, 2022.

* cited by examiner

OPTICAL INTEGRATED CIRCUIT DEVICE ARRAY HAVING BI-DIRECTIONAL CHARACTERISTICS AND OPTICAL SYSTEM USING THE SAME

CROSS-REFERENCE TO RELATED APPLICATION

Korean Patent Application No. 10-2018-0008954, filed on Jan. 24, 2018, in the Korean Intellectual Property Office, and entitled: "Optical Integrated Circuit Device Array Having Bi-Directional Characteristics and Optical System Using the Same," is incorporated by reference herein in its entirety.

BACKGROUND

1. Field

Embodiments relate to an optical integrated circuit device, and more particularly, to an optical integrated circuit device array having bi-directional characteristics and an optical system having a bi-directional characteristic using the optical integrated circuit device array.

2. Description of the Related Art

An optical system using light, e.g., a light detection and ranging (LiDAR) system, may detect location information, e.g., a distance and a moving speed with respect to a target (or an object) that is stopped or in a moving state. The LiDAR system may also acquire geometric information, e.g., shape and/or size information, with respect to a two-dimensional (2D) target or a three-dimensional (3D) target. The LiDAR system may include a light source and optical elements.

SUMMARY

According to an aspect, a bi-directional optical integrated circuit device array includes a plurality of bi-directional optical integrated circuit unit devices integrated on a substrate and separated along two-dimensions.

Each of the bi-directional optical integrated circuit unit devices may include a single wavelength laser light source integrated on the substrate, a bi-directional optical device integrated on the substrate and optically connected to the laser light source, and an antenna integrated on the substrate and optically connected to the bi-directional optical device.

Each of the bi-directional optical integrated circuit unit devices may include a laser light source integrated on the substrate to emit light of a single wavelength and a bi-directional optical device integrated on the substrate. The bi-directional optical device is to amplify light emitted from the laser light source, transmit amplified light to a surrounding environment through an antenna, and receive light reflected by the surrounding environment through the antenna.

According to an aspect, there is provided an optical system for analyzing a target, the optical system including a bi-directional optical integrated circuit device array that is having the target within its field of view and includes a plurality of bi-directional optical integrated circuit unit devices integrated on a substrate in a two-dimensional pattern and a lens between the target and the bi-directional optical integrated circuit device array.

Each of the bi-directional optical integrated circuit unit devices may include a single wavelength laser light source and a plurality of bi-directional optical devices that transmit light emitted from the laser light source to a target through the lens and receives light reflected by the target through the lens.

BRIEF DESCRIPTION OF THE DRAWINGS

Features will become apparent to those of skill in the art by describing in detail exemplary embodiments with reference to the attached drawings in which.

DETAILED DESCRIPTION

Hereinafter, embodiments will be described with reference to the accompanying drawings. The embodiments may be realized by a single embodiment, and the embodiments below may be realized by combining at least one embodiment. Accordingly, the technical sprit of the disclosure is not interpreted by being limited to a single embodiment.

Figure 1:
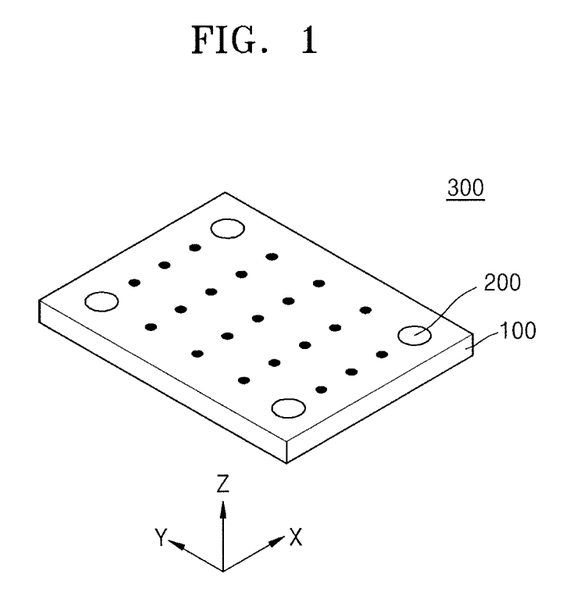
FIG. 1 illustrates a perspective view of an optical integrated circuit device array having a bi-directional characteristic according to an embodiment.

FIG. 1 is a perspective view of an optical integrated circuit device array 300 having a bi-directional characteristic (hereinafter, referred to as a bi-directional optical integrated circuit device array 300) according to an embodiment. In detail, the bi-directional optical integrated circuit device array 300 according to the present embodiment may include a plurality of bi-directional optical integrated circuit unit devices 200 that are integrated by being separated in two dimensions (2D) on a substrate 100.

The substrate 100 may include a silicon material. The substrate 100 may be a bulk silicon substrate. The bi-directional optical integrated circuit device array 300 may be simply configured at a low cost and in a small scale by using silicon photonics.

Individual bi-directional optical integrated circuit unit devices 200 may be integrated on the substrate 100 and spaced apart in an X-direction and a Y-direction. The X-direction and the Y-direction may be perpendicular to each other. The bi-directional optical integrated circuit unit devices 200 may be integrated on an X-Y plane. A Z-direction may be a direction perpendicular to the X-Y plane.

In FIG. 1, the bi-directional optical integrated circuit unit devices 200 are in the X-direction and the Y-direction at the same interval on the substrate 100. Alternatively, the bi-directional optical integrated circuit unit devices 200 may be arranged at different intervals in a matrix in the X-direction and the Y-direction, and in various other patterns.

In FIG. 1, twenty-five bi-directional optical integrated circuit unit devices 200 are shown on the substrate 100. However, more or fewer bi-directional optical integrated circuit unit devices 200 may be on the substrate 100. Details of a configuration of the bi-directional optical integrated circuit unit devices 200 will be described in detail below.

The bi-directional optical integrated circuit device array 300 may be referred to as a bi-directional optical integrated circuit chip. The bi-directional optical integrated circuit device array 300 may be an optical transceiver that transmits light into a surrounding environment and receives light from the surrounding environment. The bi-directional characteristics may mean transmission of light and reception of light incident from the surrounding environment.

Since the bi-directional optical integrated circuit device array 300 includes a plurality of the bi-directional optical integrated circuit unit devices 200, the bi-directional optical integrated circuit device array 300 may simultaneously transmit light in all directions through surrounding environment toward a target (or an object) and may simultaneously receive light reflected by the target. Accordingly, the bi-directional optical integrated circuit device array 300 may be used for obtaining location information, e.g., a distance and a moving speed with respect to a target, and/or geometric information, e.g., a two-dimensional (2D) or three-dimensional (3D) shape and/or size of the target.

Also, one of the bi-directional optical integrated circuit unit devices 200 included in the bi-directional optical integrated circuit device array 300 according to an embodiment may transmit light in a light emission direction towards a target and may receive only light reflected from the target in a light reflection direction which is opposite the light emission direction, e.g., light reflected directly back along the transmission path. Accordingly, the bi-directional optical integrated circuit unit devices 200 may be used for precisely obtaining location information and/or geometric information of a target.

An optical system that uses the bi-directional optical integrated circuit device array 300 and the bi-directional optical integrated circuit unit devices 200 will be described below.

Figure 2:
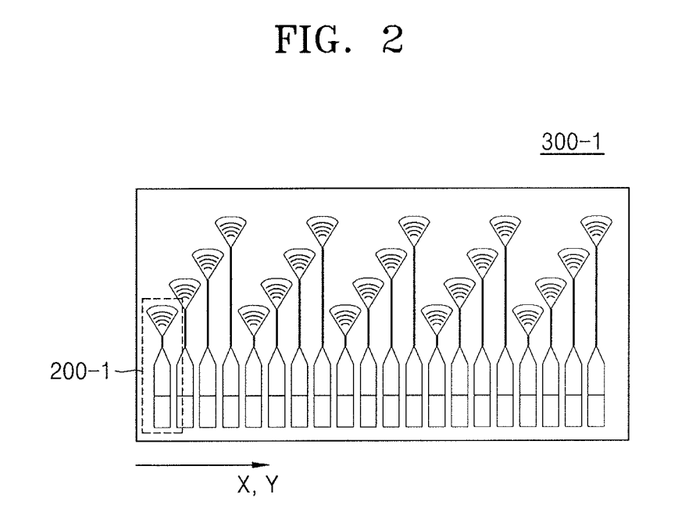
FIG. 2 illustrates a plan view of an optical integrated circuit device array having a bi-directional characteristic according to an embodiment.
Figure 3:
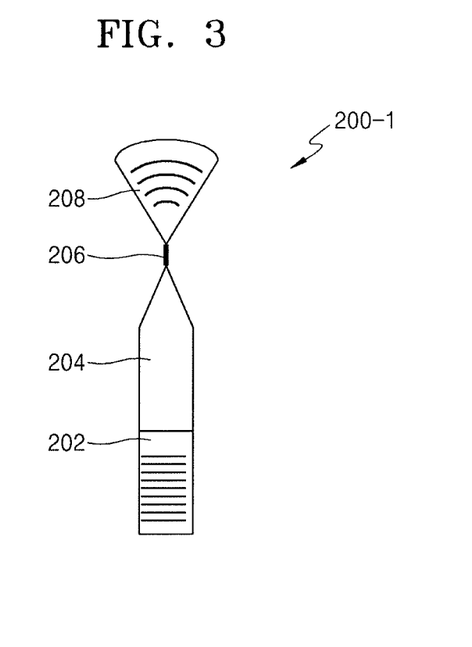
FIG. 3 illustrates a magnified view of one of optical integrated circuit unit devices having a bi-directional characteristic of FIG. 2.

FIG. 2 is a plan view of a bi-directional optical integrated circuit device array 300-1 according to an embodiment. FIG. 3 is a magnified view of a single unit of a bi-directional optical integrated circuit unit device 200-1 of FIG. 2.

In detail, the bi-directional optical integrated circuit device array 300-1 according to an embodiment may include a plurality of bi-directional optical integrated circuit unit devices 200-1 arranged in the X-direction and the Y-direction on the substrate 100 (refer to FIG. 1). The bi-directional optical integrated circuit unit devices 200-1 may be bi-directional optical transceivers.

In one of the bi-directional optical integrated circuit unit devices 200-1, a laser light source 202 having a single wavelength, a bi-directional optical device 204, a waveguide 206, and an antenna 208 may be integrated on the substrate 100. The bi-directional optical integrated circuit unit devices 200 do not require a wavelength variable laser light source or a phase controlled antenna, and, thus, may have a simple configuration. Accordingly, the bi-directional optical integrated circuit unit devices 200-1 may be manufactured at a low cost and in a small scale.

The laser light source 202 may be a distributed feedback laser. The laser light source 202 may emit light of a single wavelength. A bi-directional optical device 204 may be optically connected to the laser light source 202. The bi-directional optical device 204 may serve as both an optical amplifier and an optical receiver.

The bi-directional optical device 204 may be a PIN diode. Light emitted from the laser light source 202 may be amplified by the bi-directional optical device 204 and then may be transmitted to a first end of the waveguide 206. The antenna 208 may receive amplified light from a second end of the waveguide and output the amplified light to the surrounding environment. Light received by the antenna 208 may be output to the second end of the waveguide 206. The bi-directional optical device 204 may receive and detect light output from the first end of the waveguide 206 receiver. Thus, the bi-directional optical device 204 may be an optical transceiver that both transmits and receives, i.e., detects, light. A configuration and an operation of the PIN diode will be described in detail below.

The antenna 208 is optically connected to the bi-directional optical device 204 through the waveguide 206. The waveguide 206 may be configured of a silicon layer. The antenna 208 may readily radiate or transmit light to the surrounding environment and may readily receive light from the surrounding environment.

FIGS. 4 through 7 are drawings for explaining the bi-directional optical integrated circuit unit device 200-1 of FIG. 3. In detail, FIGS. 4 through 7 are drawings for explaining the bi-directional optical integrated circuit unit device 200-1 of FIG. 3.

Figure 4:
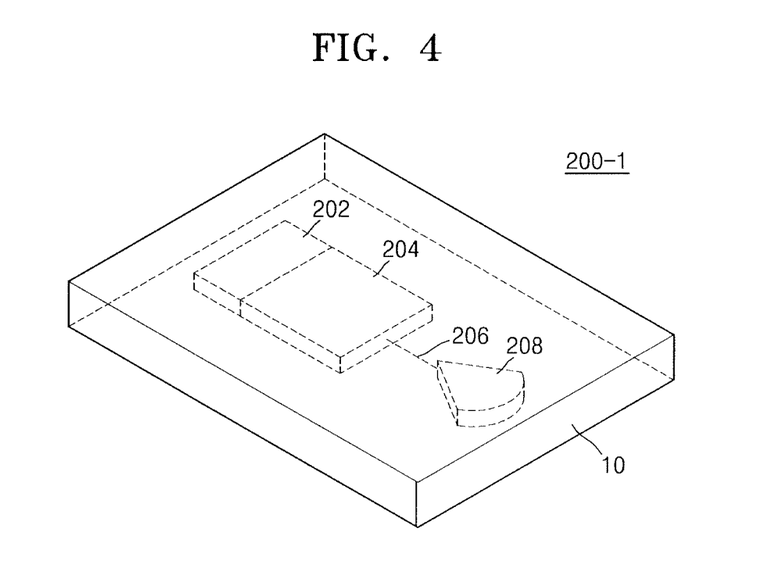
FIGS. 4 through 7 illustrate views for explaining the optical integrated circuit unit device having a bi-directional characteristic of FIG. 3.

FIG. 4 is a perspective view of the bi-directional optical integrated circuit unit device 200-1 according to the present embodiment. In the bi-directional optical integrated circuit unit device 200-1, the laser light source 202 outputting a single wavelength, the bi-directional optical device 204, the waveguide 206, and the antenna 208 may be integrated on the substrate 100.

Figure 5:
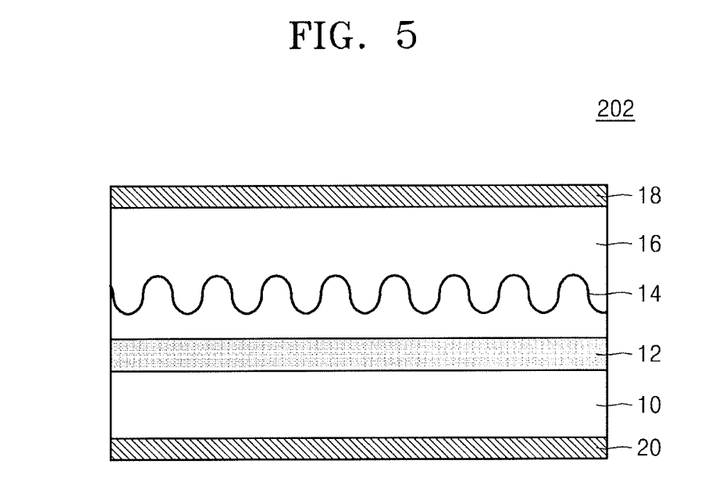

FIG. 5 is a cross-sectional view of the laser light source 202 of FIG. 4. The laser light source 202 may be a distributed feedback laser diode (DFB-LD). The laser light source 202 may be a semiconductor laser including an N-type semiconductor layer 10 (or an N-type clad layer), an active layer 12, a grating layer 14, and a P-type semiconductor layer 16 (or a P-type clad layer). The active layer 12 may include a semiconductor III-V group gain layer. Electrode layers 18 and 20 may be respectively formed on the P-type semiconductor layer 16 and under the N-type semiconductor layer 10. When a bias voltage is applied to the electrode layers 18 and 20, light of a single wavelength may be emitted from the active layer 12. Light emitted from the active layer 12 may be infrared light or visible light. The light emitted from the active layer 12 may be pulsed light.

Figure 6:
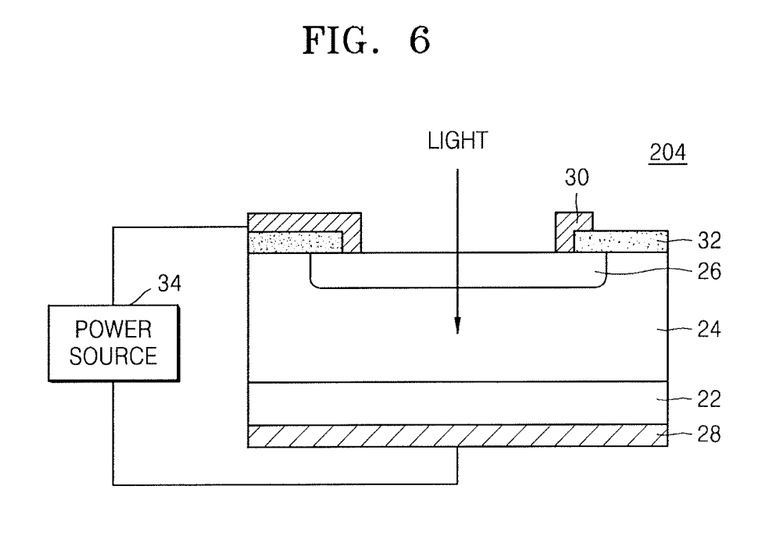

FIG. 6 is a cross-sectional view of the bi-directional optical device 204 of FIG. 4. The bi-directional optical device 204 may include a PIN diode. The PIN diode may include a P-type semiconductor region 26, an N-type semiconductor region 22, and an I-type (intrinsic-type) semiconductor region 24 between the P-type semiconductor region 26 and the N-type semiconductor region 22. Electrode layers 30 and 28 may be respectively formed on the P-type semiconductor region 26 and under the N-type semiconductor region 22. The bi-directional optical device 204 may include a protection layer 32. A power source 34 supplies a bias voltage to the PIN diode.

Figure 7:
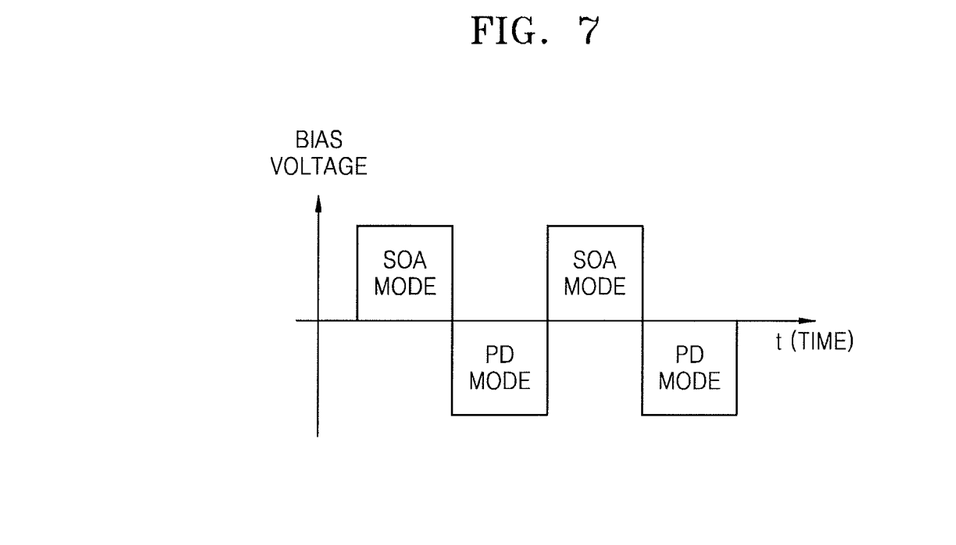

FIG. 7 is a graph for explaining an operation mode of the bi-directional optical device 204 of FIG. 6 according to a bias voltage. When a forward bias voltage is applied, the antenna 208 may transmit light to the surrounding environment. When a reverse bias voltage is applied, the antenna 208 may receive light from the surrounding environment.

In particular, when the power source 34 applies the forward bias voltage to the PIN diode, light incident on the bi-directional optical device 204 may be amplified. In other words, when a positive voltage is applied to the P-type semiconductor region 26 and a negative voltage is applied to the N-type semiconductor region 22 of the PIN diode, the bi-directional optical device 204 may be in a semiconductor optical amplification mode (SOA MODE).

Accordingly, the bi-directional optical device 204 may operate as an optical amplifier, e.g., a semiconductor optical amplifier. Light emitted from the laser light source 202 of FIG. 4 may be amplified by the bi-directional optical device 204 and transmitted to the waveguide 206 to be output by the antenna 208.

When the power source 34 applies the reverse bias voltage to the PIN diode, the bi-directional optical device 204 may receive light. In other words, when a negative voltage is applied to the P-type semiconductor region 26 and a positive voltage is applied to the N-type semiconductor region 22 of the PIN diode, the bi-directional optical device 204 may be in a photo-diode mode (PD MODE). In particular, the PIN diode may output an electrical current is response to the reflected light incident thereon.

Accordingly, the bi-directional optical device 204 may operate as an optical receiver. Light received from the antenna 208 may be received by the bi-directional optical device 204 that operates as an optical receiver through the waveguide 206.

As a result, the bi-directional optical device 204 may operate as an optical transceiver that transmits and receives light. When the light source outputs pulsed light, the modes may be synchronized with the pulsed light, e.g., the PIN diode may operate in the SOA MODE when light is output from the light source and may operate in the PD MODE otherwise.

Figure 8:
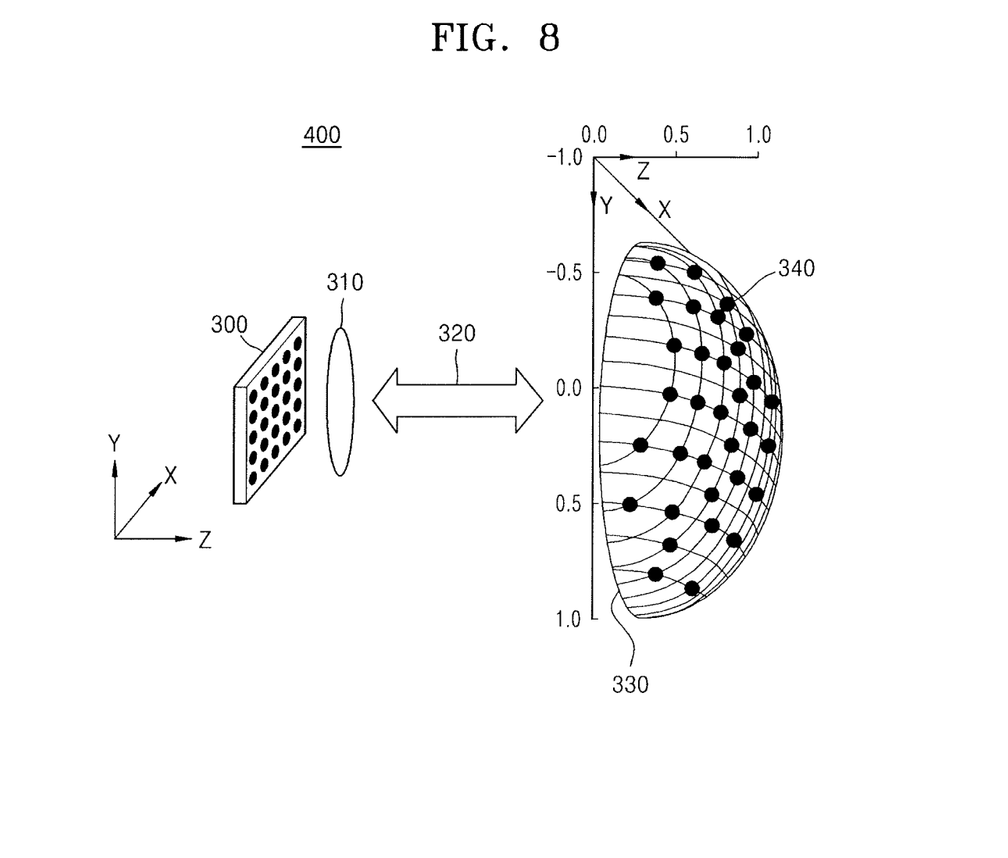
FIG. 8 illustrates a view for explaining an optical system that uses an optical integrated circuit device array having a bi-directional characteristic according to an embodiment.

FIG. 8 is a drawing for explaining an optical system 400 that uses the bi-directional optical integrated circuit device array 300 according to an embodiment. In detail, the optical system 400 of FIG. 8 may include the bi-directional optical integrated circuit device array 300, a lens 310, and a target 330 (or an object). The optical system 400 may be a LiDAR system. The bi-directional optical integrated circuit device array 300 may be located on a side of the target 330.

The bi-directional optical integrated circuit device array 300 may include the bi-directional optical integrated circuit unit devices 200. The bi-directional optical integrated circuit unit devices 200 may be integrated on an X-Y plane. Since the bi-directional optical integrated circuit device array 300 and the bi-directional optical integrated circuit unit devices 200 are described above with reference to FIGS. 2 through 7, descriptions thereof are omitted.

The lens 310 may be arranged between, e.g., in an optical path between, the bi-directional optical integrated circuit device array 300 and the target 330. The lens 310 may define a field of view of the optical system 400. The target 330 may have a concave curved surface on the X-Y plane. The target 330 may be three-dimensional.

The bi-directional optical integrated circuit device array 300 of the optical system 400 may form a 2D point light source array 340 on the target 330 by simultaneously transmitting light 320 towards the target 330 in all directions in the field of view through the lens 310. For example, when the light sources output pulsed light, they may be synchronized. The light 320 of the point light source array 340 incident on the target 330 may be reflected by the target 330 and simultaneously received by the bi-directional optical integrated circuit device array 300 through the lens 310. The bi-directional optical integrated circuit device array 300 may be used for obtaining location information about the target 330, e.g., a distance to the target 330 and/or a moving speed of the target 330, or geometric information about the target 330, e.g., size and/or shape of the target 330.

One of the bi-directional optical integrated circuit unit devices 200 of the optical system 400 may form a single point source of the point light source array 340 by transmitting the light 320 in a light emitting direction towards the target 330 through the lens 310. Light 320 of the single point light source array 340 incident on the target 330 may be reflected back to the bi-directional optical integrated circuit unit device 200 through the lens 310. One of the bi-directional optical integrated circuit unit devices 200 may receive only reflected light 320 from the target 330 in a direction opposite to that of the light emitting direction.

In other words, in the optical system 400, the bi-directional optical integrated circuit unit device 200 may receive only the light 320 reflected by the target 330 in a light reflection direction that has the same optical path as that of the light emitting direction of the light 320 emitted from the bi-directional optical integrated circuit unit device 200. The number of the bi-directional optical integrated circuit unit devices 200 of the bi-directional optical integrated circuit device array 300 may be equal to or less than the number of the point light sources of the point light source array 340. Thus, the optical system 400 may be used for obtaining location information and/or geometric information about the target 330.

Figure 9:
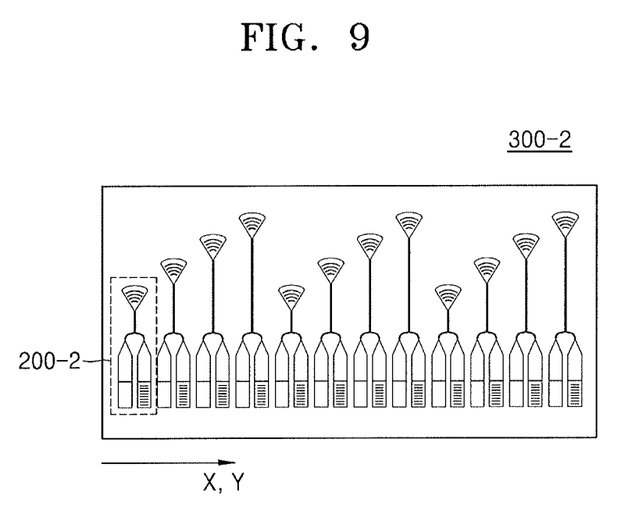
FIG. 9 illustrates a plan view of an optical integrated circuit device array having a bi-directional characteristic according to another embodiment.
Figure 10:
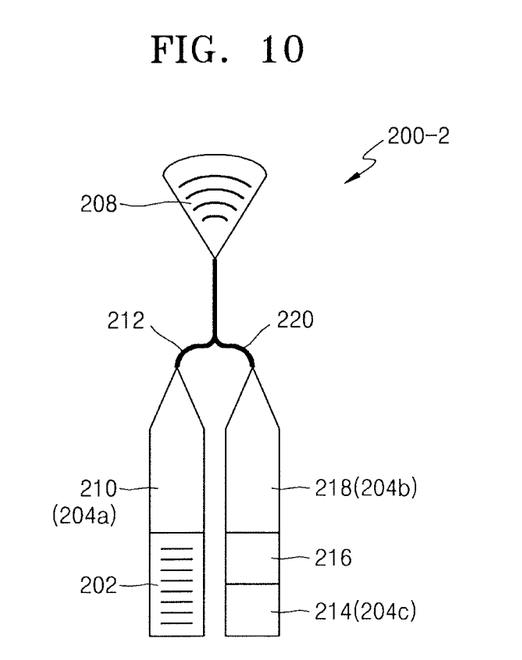
FIG. 10 illustrates a magnified view of one of optical integrated circuit unit devices having a bi-directional characteristic of FIG. 9.

FIG. 9 is a plan view of a bi-directional optical integrated circuit device array 300-2 according to an embodiment. FIG. 10 is a magnified view of one of the bi-directional optical integrated circuit unit devices 200-2 of FIG. 9.

In detail, the bi-directional optical integrated circuit device array 300-2 and the bi-directional optical integrated circuit unit devices 200-2 according to the present embodiment may be the same as the bi-directional optical integrated circuit device array 300 and the bi-directional optical integrated circuit unit devices 200 of FIGS. 2 through 7 except that bi-directional optical devices 204a, 204b, and 204c include a first optical amplifier 210, a second optical amplifier 218, and an optical receiver 214.

In FIGS. 9 and 10, for convenience of explanation, descriptions made with reference to FIGS. 2 through 7 are briefly described or omitted. Also, the bi-directional optical integrated circuit device array 300-2 and the bi-directional optical integrated circuit unit devices 200-2 of FIGS. 9 and 10 may be applied to the optical system 400 of FIG. 8.

The bi-directional optical integrated circuit device array 300-2 may include a plurality of the bi-directional optical integrated circuit unit devices 200-2 in an X-direction or a Y-direction on the substrate 100 (refer to FIG. 1). The bi-directional optical integrated circuit unit devices 200-2 may be bi-directional optical transceivers.

In the bi-directional optical integrated circuit unit devices 200-2, the laser light source 202 having a single wavelength, the bi-directional optical devices 204a, 204b, and 204c, a first waveguide 212, a bandpass filter 216, a second waveguide 220, and the antenna 208 may be integrated on the substrate 100.

The laser light source 202 may emit light of a single wavelength. The laser light source 202 may be optically connected to a first end of the bi-directional optical device 204a, and the antenna 208 may be optically connected to a second end of the bi-directional optical device 204a through the first waveguide 212. The bi-directional optical device 204a may operate as the first optical amplifier 210. Light emitted from the laser light source 202 is amplified through the first optical amplifier 210 and transmitted to the first waveguide 212. Light transmitted to the first waveguide 212 may be radiated to the surrounding environment by the antenna 208.

Light received by the antenna 208 from the surrounding environment may be received by the bi-directional optical device 204b through the second waveguide 220. The bi-directional optical device 204b may operate as the second optical amplifier 218. The second optical amplifier 218 may be located apart, e.g. spaced from, from the first optical amplifier 210. The first optical amplifier 210 and the second optical amplifier 218 may be optically connected to the antenna 208 through the two shunt devices (the first and second waveguides 212 and 220). The first optical amplifier 210 and the second optical amplifier 218 may be semiconductor optical amplifiers.

According to the present embodiment, the first optical amplifier 210 and the second optical amplifier 218 may use the semiconductor optical amplification mode of the PIN diode of FIGS. 6 and 7. According to the present embodiment, the first optical amplifier 210 and the second optical amplifier 218 may use a semiconductor laser including a P-type semiconductor layer, an N-type semiconductor layer, and an active layer between the P-type semiconductor layer and the N-type semiconductor layer. The structure of the semiconductor laser may be the same as semiconductor laser of FIG. 5 except for a grating layer 14. Light may be amplified in the semiconductor laser (i.e. the second optical amplifier 218) by receiving light from the second waveguide 220 in a state that the semiconductor laser is operated at a level below a critical oscillation value. That is, the second optical amplifier 218 may amplify light received from the second waveguide 220 in a state that the semiconductor laser, i.e., the second optical amplifier 218, is operated at a level below a critical oscillation value.

Light amplified by the second optical amplifier 218 may be received by the bi-directional optical device 204c through the bandpass filter 216. The bi-directional optical device 204c may operate as the optical receiver 214. According to the present embodiment, the optical receiver 214 may use the photo diode mode of the PIN diode of FIGS. 6 and 7.

According to the present embodiment, the optical receiver 214 may be a PN diode including a P-type semiconductor layer and an N-type semiconductor layer. The bandpass filter 216 may receive light of a wavelength band desired to be detected on the optical receiver 214 by blocking light of a specific wavelength(s). In this manner, the bi-directional optical devices 204a, 204b, and 204c may be optical transceivers that transmit amplified light to the surrounding environment through the antenna 208, and that receive light from the surrounding environment through the antenna 208, amplify the received light, and detect the amplified reflected light.

Figure 11:
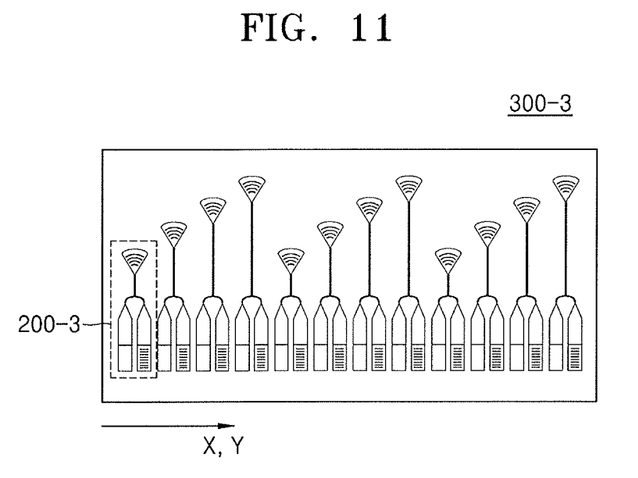
FIG. 11 illustrates a plan view of an optical integrated circuit device array having a bi-directional characteristic according to another embodiment.
Figure 12:
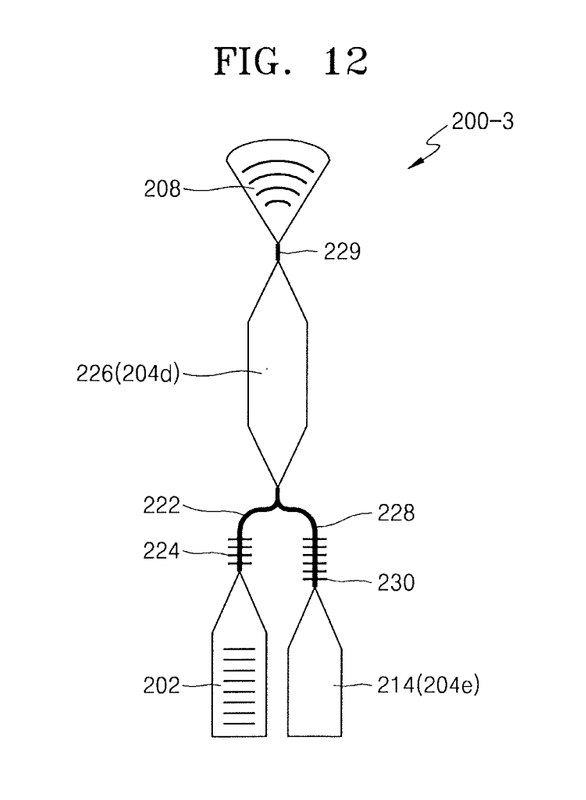
FIG. 12 illustrates a magnified view of one of optical integrated circuit unit devices of FIG. 11.

FIG. 11 is a plan view for explaining a bi-directional optical integrated circuit device array 300-3 according to an embodiment. FIG. 12 is a magnified view of a single unit of the bi-directional optical integrated circuit unit devices 200-3 of FIG. 11.

In detail, the bi-directional optical integrated circuit device array 300-3 and the bi-directional optical integrated circuit unit devices 200-3 according to the present embodiment are the same as the bi-directional optical integrated circuit device array 300 and the bi-directional optical integrated circuit unit devices 200 of FIGS. 2 through 7 except that bi-directional optical devices 204d and 204e include an optical amplifier 226 and the optical receiver 214.

In FIGS. 11 and 12, fort convenience of explanation, descriptions made with reference to FIGS. 2 through 7 are briefly described or omitted. Also, the bi-directional optical integrated circuit device array 300-3 and the bi-directional optical integrated circuit unit devices 200-3 may be applied to the optical system 400 of FIG. 8.

The bi-directional optical integrated circuit device array 300-3 may include a plurality of the bi-directional optical integrated circuit unit devices 200-3 in an X-direction or a Y-direction on the substrate 100 (refer to FIG. 1). The bi-directional optical integrated circuit unit devices 200-3 may be bi-directional optical transceivers.

In the bi-directional optical integrated circuit unit devices 200-3, the laser light source 202 having a single wavelength, the bi-directional optical devices 204d and 204e, a first waveguide 222, an isolator 224, a bandpass filter 230, a second waveguide 228, and the antenna 208 may be integrated on the substrate 100.

The laser light source 202 may output light of a single wavelength. The laser light source 202 may be optically connected to a first end of the bi-directional optical device 204d through the first waveguide 222, and the antenna 208 may be optically connected to a second side of the bi-directional optical device 204d through a third waveguide 229. The bi-directional optical device 204d may operate as an optical amplifier 226. Light emitted from the laser light source 202 may pass through the isolator 224, may be amplified through the optical amplifier 226, and may be transmitted to the antenna 208 through the third waveguide 229.

The isolator 224 may insure that light emitted from the laser light source 202 is only transmitted in a direction towards the optical amplifier 226, i.e., in a forward direction, while light amplified in the optical amplifier 226 is not to return in a direction towards the first waveguide 222 or the laser light source 202, i.e., in a reverse direction. Light transmitted to the antenna 208 may be radiated to the surrounding environment.

Light received by the antenna 208 from the surrounding environment may be amplified in the optical amplifier 226 and may be received by the bi-directional optical device 204e through the second waveguide 228. The bi-directional optical device 204e may operate as an optical receiver 214. The second waveguide 228 may be located apart from the first waveguide 222. The optical amplifier 226 may be optically connected to the laser light source 202 and the optical receiver 214 through the two shunt devices (the first and second waveguides 222 and 228).

The optical amplifier 226 may operate as a semiconductor optical amplifier. According to the present embodiment, the optical amplifier 226 may use the semiconductor optical amplification mode of the PIN diode of FIGS. 6 and 7. According to the present embodiment, the amplifier 226 may use a semiconductor laser including a P-type semiconductor layer, an N-type semiconductor layer, and an active layer between the P-type semiconductor layer and the N-type semiconductor layer. The optical amplifier 226 may amplify light received from the first waveguide 222 or from the antenna 208 when the semiconductor laser is operated below a critical oscillation value.

Reflected light amplified in the optical amplifier 226 may be incident on the optical receiver 214 through the bandpass filter 230. According to the present embodiment, the optical receiver 214 may use the photodiode mode of the PIN diode of FIGS. 6 and 7 described above.

According to the present embodiment, the optical receiver 214 may be a PN diode including a P-type semiconductor layer and an N-type semiconductor layer. The bandpass filter 230 may transmit light of a wavelength band to be detected by the optical receiver 214 by blocking light of a specific wavelength band. In this manner, the bi-directional optical devices 204*d* and 204*e* may operate as optical transceivers that transmit amplified light to the surrounding environment via the antenna 208 and receive reflected light from the antenna 208 by amplifying and detecting reflected light.

Figure 13:
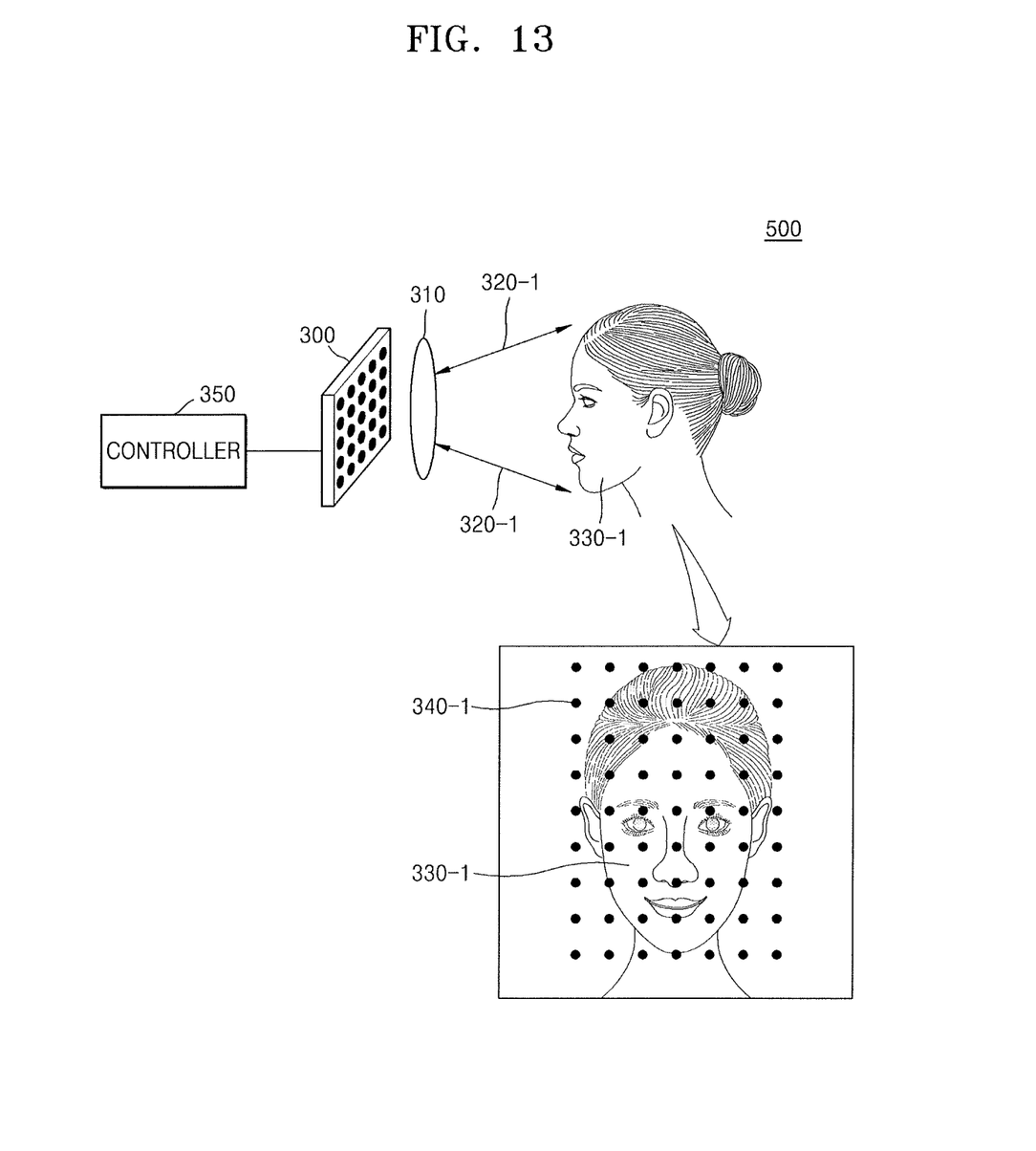
FIG. 13 illustrates a view for explaining an optical system that uses an optical integrated circuit device array having a bi-directional characteristic according to an embodiment.

FIG. 13 is a drawing for explaining an optical system 500 that uses the bi-directional optical integrated circuit device array 300 according to an embodiment. In detail, when the optical system 500 of FIG. 13 is compared with the optical system 400 of FIG. 8, the optical system 500 is the same as the optical system 400 except that a target 330-1 of FIG. 13 is a face of a human and a controller 350 is further connected to the bi-directional optical integrated circuit device array 300. In describing the optical system 500 of FIG. 13, contents that are the same as the optical system 400 of FIG. 8 are briefly described or omitted.

The optical system 500 may include the bi-directional optical integrated circuit device array 300, the lens 310, a target 330-1, and a controller 350. The bi-directional optical integrated circuit device array 300 may include a plurality of bi-directional optical integrated circuit unit devices 200. The target 330-1 may have a 3D shape since the target 330-1 is a face of a human.

The bi-directional optical integrated circuit device array 300 of the optical system 500 may realize a point light source array 340-1 on the face of the human, that is, on the target 330-1 by simultaneously transmitting light 320-1 in all directions in the field of view towards the target 330-1 through the lens 310. The light 320-1 of the point light source array 340-1 realized on the target 330-1 is reflected by the target 330-1 and may be simultaneously received by the bi-directional optical integrated circuit device array 300 through the lens 310.

Also, a single point light source array 340-1 may be realized by transmitting light 320-1 from the single bi-directional optical integrated circuit unit device 200 in a light emission direction towards the target 330-1 through the lens 310, and the light 320-1 of the single point light source array 340-1 that is realized on the target 330-1 is reflected by the target 330-1 in a light reflection direction which is opposite to the light emission direction and may be received by the single bi-directional optical integrated circuit unit device 200.

Light signals transmitted from and received by the bi-directional optical integrated circuit device array 300 are analyzed in the controller 350. Thus, location information or geometric information of the target 330-1, for example, a distance to or a size and/or shape of the target 330-1 may be obtained. The controller 350 may measure a time between when the light 320-1 is emitted from the bi-directional optical integrated circuit device array 300 and when the light 320-1 reflected by the target 330-1 is received, i.e., a time of flight, and/or the intensity change of a light signal. Thus, the optical system 500 may obtain location information and/or geometric information of the target 330-1.

The controller 350 may include one or more hardware components (e.g., an analog circuit, a logic circuit, etc.) to perform functions described above and to be described below. Additionally or alternatively, the controller 350 may include one or more processor cores. Functions of the controller 350 described above and to be described below may be implemented with a program code of software and/or firmware, and the processor core(s) of the controller 350 may execute an instruction set of the program code. The processor core(s) of the controller 350 may process various kinds of arithmetic operations and/or logical operations for the purpose of executing the instruction set.

Figure 14:
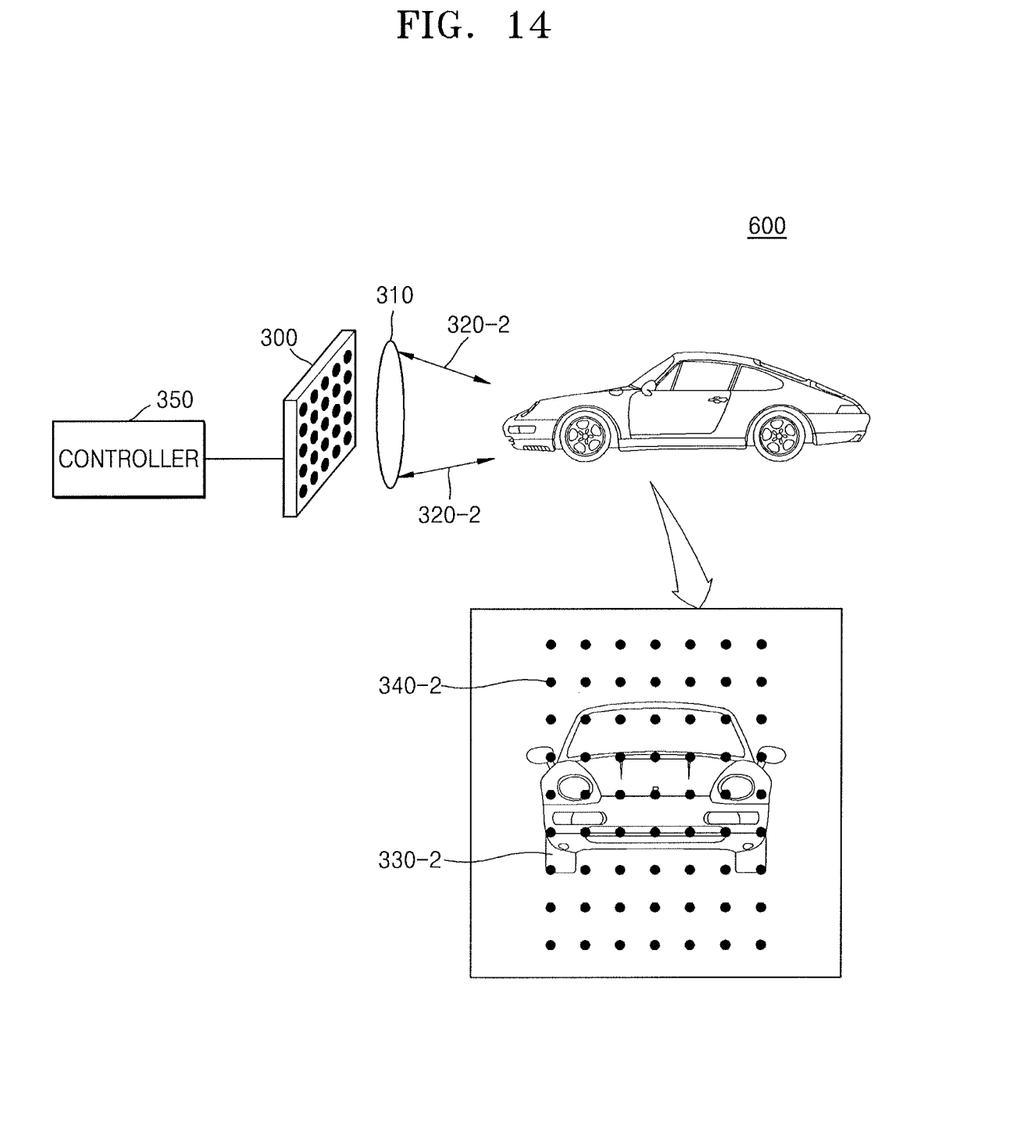
FIG. 14 illustrates a view for explaining an optical system that uses an optical integrated circuit device array having a bi-directional characteristic according to an embodiment.

FIG. 14 is a drawing for explaining an optical system 600 that uses the bi-directional optical integrated circuit device array 300 according to an embodiment. In detail, when the optical system 600 of FIG. 14 is compared with the optical systems 400 and 500 of FIGS. 8 and 13, the optical system 600 in FIG. 14 is the same as the optical systems 400 and 500 of FIGS. 8 and 13 except that a target 330-2 in FIG. 14 is an automobile and the controller 350 is further connected to the bi-directional optical integrated circuit device array 300. In describing the optical system 600 of FIG. 14, contents that are the same as the optical systems 400 and 500 of FIGS. 8 and 13 are briefly described or omitted.

The Internet of Things (IoTs), in which computing devices are embedded in everyday physical devices, has been increasing. An autonomous vehicle is one of the most important applications for IoT. The optical system 600 may be applied to the autonomous vehicle.

The optical system 600 may include the bi-directional optical integrated circuit device array 300, the lens 310, a target 330-2, and the controller 350. The bi-directional optical integrated circuit device array 300 may include the plurality of bi-directional optical integrated circuit unit devices 200. The target 330-2 is an automobile, i.e., a movable object having a 3D shape.

The bi-directional optical integrated circuit device array 300 of the optical system 600 may form a 2D point light source array 340-2 on the automobile by transmitting light 320-2 to the target 330-2 in all directions through the lens 310 in the field of view thereof. The light 320-2 of the point light source array 340-2 realized on the target 330-2 is re-reflected by the target 330-2, and may be simultaneously received by the bi-directional optical integrated circuit device array 300 through the lens 310.

Light signals transmitted from and received by the bi-directional optical integrated circuit device array 300 are analyzed by the controller 350, and thus, the optical system 600 may detect location information and moving speed information of the automobile, that is, the target 330-2, and also, may obtain information of a 3D size and shape of the target 330-2. The controller 350 may measure a time between a point when the light 320-2 is emitted from the bi-directional optical integrated circuit device array 300 and a point when the light 320-2 reflected by the target 330-2 is received, i.e., a time of flight and/or the intensity change of a light signal. Thus, the optical system 600 may obtain location information and/or geometric information about the target 330-2.

While FIG. 14 illustrates the automobile as the target 330-2, the optical system 600 may be mounted on an automobile at one or more locations. Thus, the optical system 300 may recognize location information and/or geometric information about targets, e.g., obstacles, in the surrounding environment of the automobile.

The bi-directional optical integrated circuit device array according to the present embodiment may be manufactured at a low cost and in a small scale, and in a simple configuration by using silicon photonics.

The bi-directional optical integrated circuit device array may include a plurality of bi-directional optical integrated circuit unit devices two-dimensionally integrated on a substrate. Each of the bi-directional optical integrated circuit unit devices may include a laser light source having a single wavelength, a bi-directional optical device, e.g., an optical transceiver, and an antenna.

Accordingly, the bi-directional optical integrated circuit device array may be used for obtaining location information or geometric information of a target (or an object) by simultaneously transmitting light in all direction towards the target and simultaneously receiving light reflected by the target.

Also, each of the bi-directional optical integrated circuit unit devices included in the bi-directional optical integrated circuit device array may be used for obtaining precise location information or geometric information by transmitting light in an light emission direction towards the target and by receiving only light reflected from the target in a light reflection direction opposite to the light emission direction.

Also, the bi-directional optical integrated circuit device array has a simple configuration since it does not require a wavelength variable laser light source or antennas to be phase controlled. Therefore, the bi-directional optical integrated circuit device array may be manufactured at a low cost and in a small scale.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A bi-directional optical integrated circuit device array, comprising:
a plurality of bi-directional optical integrated circuit unit devices integrated on a substrate and separated from each other along two-dimensions, wherein each of the plurality of bi-directional optical integrated circuit unit devices includes:
a laser light source integrated on the substrate, the laser light source to output light of a single wavelength;
a bi-directional optical device integrated on the substrate and optically connected to the laser light source; and
an antenna integrated on the substrate and optically connected to the bi-directional optical device, wherein:
the bi-directional optical device includes a PIN diode, and when a forward bias voltage is applied to the PIN diode, the PIN diode operates as an optical amplifier, and, when a reverse bias voltage is applied to the PIN diode, the PIN diode operates as an optical receiver.

2. The bi-directional optical integrated circuit device array as claimed in claim 1, wherein the laser light source is a distributed feedback laser.

3. The bi-directional optical integrated circuit device array as claimed in claim 1, wherein the antenna is optically connected to the bi-directional optical device through a waveguide.

4. A bi-directional optical integrated circuit device array, comprising:
a plurality of bi-directional optical integrated circuit unit devices that are two-dimensionally (2D) integrated on a substrate, wherein each of the bi-directional optical integrated circuit unit devices includes:
a laser light source integrated on the substrate to emit light of a single wavelength; and
a bi-directional optical device integrated on the substrate, the bi-directional optical device to:
amplify light output from the laser light source,
transmit amplified light to a surrounding environment via an antenna, and
receive light reflected by the surrounding environment through the antenna,
wherein the bi-directional optical device includes:
an optical amplifier to amplify light output from the laser light source and to amplify light reflected by the surrounding environment;
an optical receiver to detect amplified reflected light from the optical amplifier;
a first waveguide optically connecting the laser light source and the optical amplifier;
a second waveguide, separate from the first waveguide, optically connecting the optical receiver and the optical amplifier;
an isolator on the first waveguide between the laser light source and the optical amplifier; and
a bandpass filter on the second waveguide between the optical receiver and the optical amplifier.

5. The bi-directional optical integrated circuit device array as claimed in claim 4, wherein the bi-directional optical device serves as both an optical amplifier that amplifies light from the laser light source and transmits light to the surrounding environment and as an optical receiver that receives light reflected by the surrounding environment.

6. An optical system for analyzing a target, the optical system comprising:
a bi-directional optical integrated circuit device array having the target within its field of view, the bi-directional optical integrated circuit device array including a plurality of bi-directional optical integrated circuit unit devices integrated on a substrate in a two-dimensional pattern; and
a lens between the target and the bi-directional optical integrated circuit device array,
wherein each of the bi-directional optical integrated circuit unit devices includes:
a laser light source to emit light of a single wavelength; and
a plurality of bi-directional optical devices to transmit light emitted from the laser light source to the target through the lens and to receive light reflected by the target through the lens,
wherein each of the bi-directional optical devices includes:
an optical amplifier to amplify light from the laser light source, to transmit amplified light towards the target, and to amplify light reflected by the target; and an optical receiver to detect amplified reflected light output by the optical amplifier,
a first waveguide optically connecting the laser light source and the optical amplifier;
a second waveguide, separate from the first waveguide, optically connecting the optical receiver and the optical amplifier;
an isolator on the first waveguide between the laser light source and the optical amplifier; and
a bandpass filter on the second waveguide between the optical receiver and the optical amplifier.

7. The optical system as claimed in claim 6, wherein light transmitted to the target and light reflected by the target form a two-dimensional point light source array.

8. The optical system as claimed in claim 6, further comprising antennas optically connected to respective bi-directional optical devices.

9. The optical system as claimed in claim 6, wherein each of the bi-directional optical devices serves as both an optical amplifier and an optical receiver.

* * * * *